US012615489B2

(12) United States Patent
Cotanis et al.

(10) Patent No.: US 12,615,489 B2
(45) Date of Patent: Apr. 28, 2026

(54) SYSTEM AND METHOD FOR PRECISION DRIVE TESTING OF A CELLULAR NETWORK

(71) Applicant: INFOVISTA S.A.S., Massy (FR)

(72) Inventors: Irina Cotanis, Warrenton, VA (US); Jaana Tengman, Kåge (SE)

(73) Assignee: INFOVISTA S.A.S., Massy (FR)

( * ) Notice: Subject to any disclaimer, the term of this patent is extended or adjusted under 35 U.S.C. 154(b) by 470 days.

(21) Appl. No.: 18/176,363

(22) Filed: Feb. 28, 2023

(65) Prior Publication Data

US 2023/0276192 A1 Aug. 31, 2023

Related U.S. Application Data

(60) Provisional application No. 63/314,918, filed on Feb. 28, 2022.

(51) Int. Cl.
H04W 4/021 (2018.01)
H04W 4/024 (2018.01)
H04W 4/44 (2018.01)
H04W 24/10 (2009.01)

(52) U.S. Cl.
CPC ........... H04W 4/021 (2013.01); H04W 4/024 (2018.02); H04W 4/44 (2018.02); H04W 24/10 (2013.01)

(58) Field of Classification Search
CPC ............... G08G 1/0112; G08G 1/0129; G08G 1/096811; G08G 1/202; H04W 16/18; H04W 24/02; H04W 24/04; H04W 24/10; H04W 4/021; H04W 4/024; H04W 4/44
See application file for complete search history.

(56) References Cited

U.S. PATENT DOCUMENTS

2020/0202730 A1 6/2020 Nayak
2023/0413072 A1* 12/2023 Chowdhury .......... H04W 24/10

FOREIGN PATENT DOCUMENTS

WO WO 2022/091108 5/2022

OTHER PUBLICATIONS

European Search Report dated Jul. 18, 2023, issued in European counterpart application No. 23159012.6.

* cited by examiner

*Primary Examiner* — Timothy X Pham
(74) *Attorney, Agent, or Firm* — Womble Bond Dickinson (US) LLP

(57) ABSTRACT

A method and system for Precision Drive Testing (PDT) of cellular wireless networks (e.g., 2G/3G/4G/LTE, 5G, 6G). The PDT system and method are cloud-based, automated, remotely controlled and allow for directed testing of user/ device or machine experience of network(s) and service(s) performance by running pre-defined use cases, specific test scripts on pre-defined (pre-calculated) routes or within pre-defined (pre-calculated) areas of interest for the use case. The PDT may be automatically and remotely triggered by AI/ML based network sensing by drive test agents and/or outcomes (results) of network and/or service performance data and/or customer analytics or raw network and/or service and/or customer data, and/or network planning data, and/or new deployments of networks/technologies/services/ devices, and benchmarking data.

26 Claims, 3 Drawing Sheets

SYSTEM AND METHOD FOR PRECISION DRIVE TESTING OF A CELLULAR NETWORK

RELATED APPLICATIONS

Priority is claimed to U.S. Provisional Patent Application No. 63/314,918, filed Feb. 28, 2022. The contents of the aforementioned application are incorporated by reference in their entirety.

FIELD OF THE INVENTION

The subject matter of the present application introduces a methodology and system for Precision Drive Testing (PDT) of cellular wireless networks (e.g., 2G/3G/4G/LTE, 5G, 6G). By Precision Drive Testing is meant a cloudified (cloud-based), fully automated, remote and directed testing of user/device or machine experience of network(s) and service(s) performance by running pre-defined test use cases, specific test scripts on pre-defined (pre-calculated) routes or within pre-defined (pre-calculated) areas of interest for the use case. The Precision Drive Testing is automatically and remotely triggered by AI/ML based network sensing by drive test agents and/or outcomes (results) of network performance and/or customer analytics or raw network and/or customer data, and/or network planning data, and/or new deployments of networks/technologies/services/devices, and benchmarking data. The automated triggering based on AI/ML algorithms comes with optimized test scripts and a set of key performance indicators (KPIs) to be collected, areas and/or routes and definition of done for the completion of the test use case under study, as well as real time feedback on the PDT status from the PDT agents.

BACKGROUND

As defined by the Next Generation Mobile Network Alliance (NGMN), 5G is not really another "G", but rather an ecosystem of technologies, services and verticals required to smoothly coexist with older wireless generations (AKA 2G/3G/4G-LTE) and access technologies, such as Wi-Fi. The goal is to provide a seamless user experience, regardless if the humans or the machines are the users. 5G networks supports three main use cases: enhanced mobile broadband (eMBB), massive machine communications (mMTC) and ultra-reliable low latency communications (URLLC), each with different peak data rates, latency, mobility and reliability requirements. Each will have different traffic load, connectivity density, device's battery life requirements, devices' performance and costs. To ensure the seamless user or machine/device experience all these dimensions need to be optimized, managed and controlled having knowledge of the user or machine/device behavior and experience which can be accessed by means of drive testing.

By design 5G aims to solve this by enabling extensive intelligence (i.e. ML/AI) at all network's layers, from the physical layer to the application layer as well as in all network nodes, including the end node (AKA the device). The ML/AI based techniques and protocols ensure a network-device self-aware communication, by enabling network mechanisms to evaluate the device's operational conditions and user's preference profile and consequently to react accordingly. Similarly, the device will use algorithms to estimate the network's load and optimize its configurations (e.g., antenna/number of beams) accordingly.

Therefore, the question regarding the need of drive testing for 5G NR rises.

Firstly, for this comprehensive intelligence to work, a series of ML/AI algorithms need to operate in coordination on architectures based on open interfaces and common data management platforms. Industry standards specify only frameworks (rather than thoroughly standardized solutions), leaving to network and device vendors the development of proprietary solutions. Therefore, the impact on user/device or machine experience of the performance of such f ML/AI algorithms, as well as their interaction to each other can only be accurately evaluated using drive testing data.

Secondly, there are several other significant reasons emerging from 5G characteristics that still require drive testing. These include, but are not limited to:

Unlike all the previous Gs, 5G is user centric (QoE centric) rather than network centric (QoS centric). Therefore, the most accurate behavior can only be evaluated at the device level. Consequently, anytime QoE evaluation of a particular service/application is required, device based testing is needed.

Many factors are expected to affect user/device or machine performance, depending on the spectrum used as well as device type. This behavior is mainly due to several areas left open and not precisely standardized. Therefore, device-based testing is a must for an accurate evaluation of the device's performance working with 5G New Radio (NR) networks.

MDT (Minimizing Drive Testing) functionality existed since LTE and works only in two modes (immediate and logged), due to heavy involved signaling. LTE MDT has not been mandatory and consequently barely used. 5G NR is designed as a leaner (reduced signaling) network and comes with enhanced MDT, therefore more likely to be used. But even so, MDT will only be implemented at physical layers, and consequently with no information on QoE of the user/device or machine. In addition, scenarios within which MDT functionality cannot be triggered or MDT data is not available in a specific area are expected to occur. In these cases, drive testing is the only one possibility to feel in the missing information. In addition, drive testing is multivendor, being able to complement vendor specific MDT data, whenever required.

Enhanced SON (Self Organizing Networks) functionality is expected from 5G new Radio. However, for the LTE case, algorithms are not defined or standardized and thus the SON behavior can differ from vendor to vendor. As with MDT functionality, SON does not cover the impact at user level (QoE). Consequently, device-based testing is needed to evaluate SON algorithms' effects on the user/device or machine experience of the quality of the network and of the services, within vendor specific as well as multivendor environments.

Consequently, based on all these aspects, it becomes clear that 5G will have strong impact on testing required, with specific need for device or machine centric testing. Therefore, the "drive testing" concept remains in place, but due to exponentially increased network complexity, cost of development, deployment, management and operation, drive testing is very much in need for significant transformation towards automated and autonomous operability, as well as evolution to AI/ML based clients embedded on devices.

Some things that will change today's drive testing solutions include, but are not limited to:

Testing probes become more predictive in almost real time, and on the edge (on device) using AI/ML techniques.

Drive testing campaigns for data collection remotely and automatically controlled, managed and post-processed, and the data analysis and problem detection (i.e. root cause analysis RCA) automatically triggered.

Transformation of the drive testing campaigns into more use case focused, faster, precise and cheaper drive test by automatically triggering and directing them on a specific route or within a specific geographical area along with the set of test scripts and their definition of done required by the use case under evaluation, with the scope of optimization, the duration, area/routes to be driven, tasks to be executed, data (KPIs and device/network events) content and size to be collected, number of test agents, number of personnel and its qualification required to drive test.

Drive testing campaigns with continuous feedback from the test agents on the testing status, such as, but not limited to: unexpected equipment failures, not found sites ID (Physical Cell Identification PCIs), routes updates.

Drive test campaigns with real time capabilities of auto-correction based on the continuous real time feedback from the test agents.

PRIOR ART

Testing techniques for network monitoring, troubleshooting and optimization cover 3 categories of data: planning, network (e.g., PM, CM, FM, DPI, CT) and user/device centric (e.g., call traces, MDT, CRM, CS, DT). Here, PM=Performance management; CM=configuration management, FM=fault management, DPI=Deep packet Inspection, CT=Call Traces, MDT=Minimizing Drive Testing, CRM=Customer Requests Management, CS=Crowd Source, DT=Drive Test.

Network testing tools can use one and/or more data sources; commonly based on data correlations aimed to solve various use cases. Lately, the testing and measurements techniques, as well as data correlations have been enhanced/transformed with cloud platforms, automation of the data management, control, processing and analysis enhanced with AI/ML techniques.

The prior art includes well-known range of solutions for various use cases, and few examples are as follows, but not limited to:

CM and FM to optimize network configuration to repair, optimize or predict faulty behavior CT, PM and CRM to identify, geolocate and troubleshoot as well as predict failures reported by subscribers Planning and CS data for traffic prediction models tuning Planning and DT data for coverage prediction models validation and tuning.

MDT and PM, CM to optimize and troubleshoot RAN (Radio Access Network)

DT for benchmarking, QoE monitoring and evaluation, use centric optimization and troubleshooting CS for detection of users and services traffic load and type space and time distribution However, no solution so far addresses the need for a methodology and system for transforming DT into a fully automated, remotely controlled and directed intelligent, AI/ML based DT solution with real time feedback on the DT status and autocorrection capabilities which can be executed faster and cheaper without requiring engineering skills. By "directed" it is meant a specific test use case which comes with a set of test scripts, set of KPIs and network/device events, drive routes, and definition of done for the drive test. In addition, DT campaigns using PDT methodology and system can be autonomously "directed" by various and/or combination of any of sources, such as, but not limited to:

AI/ML based network sensing executed by the DT agent during the drive outcomes (results) of network performance and/or customer analytics raw network and/or customer data network planning data new deployments of networks/technologies/services/devices benchmarking data

SUMMARY

The subject matter of the present patent application describes a methodology and a system for Precision Drive Testing. More particularly, the present application contemplates a number of transformations in the manner that drive testing is conducted.

The present patent application explicitly refers to transforming blind DT into a "Precision Drive Testing" defined depending on the drive test use case by several or even all of the following features, but not limited thereto: Rules for automated correlation of any other data source or combination of these or results of the analytics ran on one or more of these data sources with the scope of defining/calculating drive test routes or geographical areas Rules or algorithms for defining/calculating drive test areas and routes optimized to the drive test scope Rules for automated triggered test scripts to be run for pre-defined use cases on the defined/calculated drive tests routes or areas Optimization of the number of test scripts, content and size of the collected data set(s) (called "KPIs mask"), number of test agents towards the drive test scope Rules or algorithms to generate the "definition of done" criteria to be used to automatically end drive tests AI/ML based algorithms for network sensing during drive testing Methodology and system to enable usage of the results of network sensing during drive testing and/or different data sources, for example planning, PM, CM, CT, CRM, CS, MDT with the scope of drive test optimization/minimization in terms of duration, area/routes to be driven, tasks to be executed, test scripts, content and size data set ("KPIs mask") to be collected, number of test agents (devices), number of personnel and qualifications required to drive test using processes automation and AI/ML based algorithms Methodology and system for enabling PDT with continuous feedback on its status based on the edge analytics run on the test agents delivering information on, but not limited to: unexpected equipment failures, not found PCIs, routes updates Methodology and system enabling PDT real time auto-corrections based on the feedback from the edge analytics run on the test agents Defining criteria regarding when, where and how DT can be substituted by ML based prediction

BRIEF DESCRIPTION OF THE DRAWINGS

The subject matter of the present application can best be understood through the attached drawings in which.

DETAILED DESCRIPTION

A. Methodology Framework for Precision Drive Testing

Figure 1A:
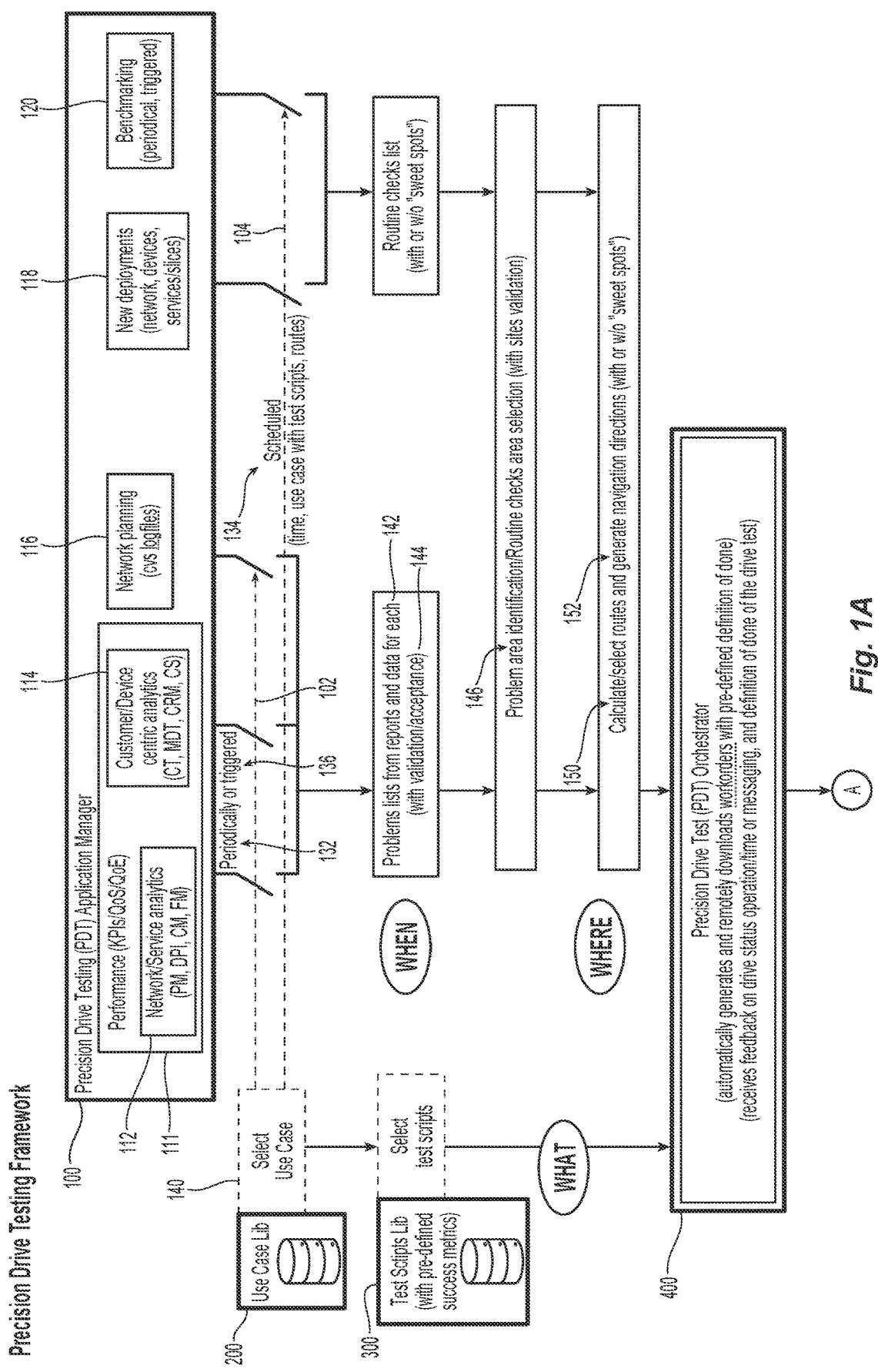
FIG. 1 (FIGS. 1A & 1B) presents methodology of the present approach.
Figure 1B:
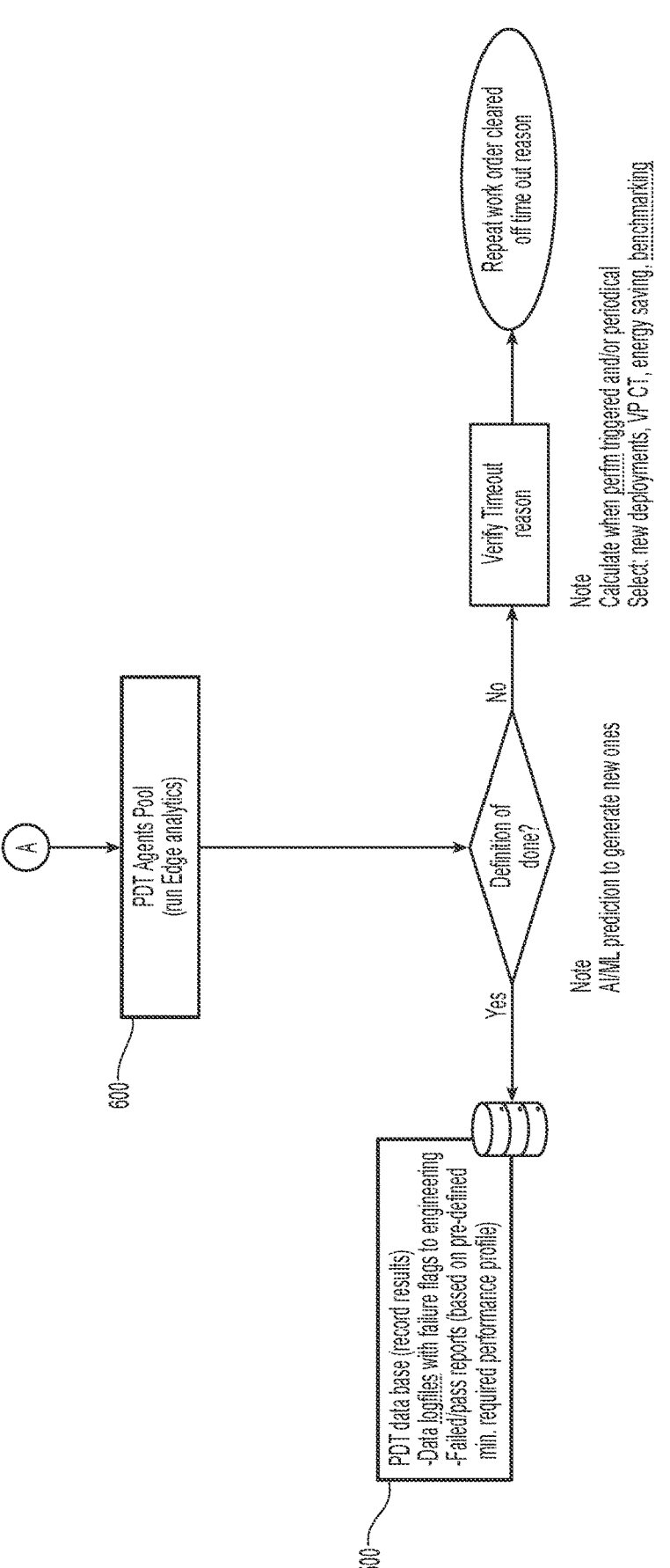

The Precision Drive Testing methodology is represented in FIG. 1. In one embodiment the methodology is implemented using six (6) entities. The six entities are connected through AI/ML (artificial intelligence/machine learning) based functional logic aimed to address such questions as: when to drive, where to drive, what to test, and for how long to test.

A.1—Entity #1—PDT Application Manager

The PDT Application Manager entity 100 comprises information based on which drive test use cases are triggered 102 or ordered 104 and routes or areas are calculated.

The information is classified in 4 applications: (1) Performance 111 (KPIs/QoS/QoE) which may include component applications Network Performance/Service 112 and Customer/Device Performance 114, (2) Network Planning 116, (3) New Deployments 118, and (4) Benchmarking 120.

These applications address the 3 main tasks related to wireless networks and which operators need to take care of: CAPEX minimization, OPEX optimization and new deployments. The Performance evaluation refers to Network, Services, and Customers, and each of these require different data sources for analysis. The New Deployments refer to the introduction of new technologies (e.g., massive/Multi-User Multiple Input Multiple Output m/MU MIMO, 3D beamforming), features (e.g., Carrier Aggregation CA, Dynamic Spectrum Sharing DSS) or services (e.g., VoLTE, VoNR, mobile cloud gaming, remote drone control). Examples of mapping tasks and applications are shown in Table 1 below.

The information represents a collection of problems, faults or routine checks (e.g., for Benchmarking and/or New Deployments application) which require drive test-based diagnosis and/or data for network, service and customer performance troubleshooting/optimization and/or planning/traffic models tuning or New Deployments or Benchmarking.

The collection of problems/faults are described by:
either raw data (AKA KPIs/QoS/QoE) with values not meeting the minimum performance requirements range or identifying an anomaly for the application under study or results of analytics applied to raw data (AKA KPIs/QoS/QoE) and flagging the identification of problems and/or anomalies specific to the application under study.

Routine checks are described by:
Benchmarking requests, from regulators and/or operators
New Deployments validation including, but is not limited to, Single Site Verification (SSV), new services launch (e.g., VoNR, remote drone control, egaming).
The information is automatically extracted
either periodically or triggered by the detection of a specific problem/fault. For example, reports of consistent retainability problems at one or several sites, expressed in PM counters or CT with unsuccessful voice/video session completions. This extraction is applied for Performance and Planning applications
or based on a schedule defined by the application. This extraction is applied for New Deployments and Benchmarking applications. For example, routine checks related to single site verification use case for New Deployments application.

A.2—Entity #2—Use Case Library

The Use Cases library entity 200 comprises sets of use cases which require drive test data to be solved. Each set is specific to an application with the scope of solving any of the 3 tasks mentioned above.

Each of the applications is managed, controlled, evaluated and troubleshoot using different sets of use cases.

A use cases is defined by a logical function of:
either red flags generated by the analytics modules or by raw data sources to be used. By red flags are meant raw data or analytics reports showing a performance anomaly
or routine checks lists for New Deployments and/or Benchmarking.
The result of the function is used to:
create the problem (or routine checks) list
calculate the PDT area or route
select the set of test scripts which PDT has to execute on the calculated route, as described in section B.3 below.
The use cases can be:
manually selected, or
automatically executed based on a pre-defined batch file, or
automatically triggered by problems/faults detected by the PDT Application Manger
automatically sweeping periodically the PDT Application Manger outputs/reports/raw data, or
scheduled for specific tasks in the case of New Deployments and Benchmarking
The selected use case for analysis extracts the corresponding test scripts from the test script lib.
Table 1 below presents a non-exhaustive list of exemplary use cases. It is understood that additional/other use cases are also contemplated.

TABLE 1

| | | Exemplary Use Cases | |
|---|---|---|---|
| Task | Application | Use case to be solved by PDT | Sources of information (raw data or analytics of raw data) as possible inputs to PDT manager |
| CAPEX minimization OPEX optimization | Planning Network/Service Performance | Prediction models validation and tuning Traffic models validation and tuning RAN performance in pre-defined areas such as: weak/no coverage, interference, RAN perf degradation (throughput, | Planning data (Cvs. Logfiles with cell IDs and geolocation) PM, CM, CT, DPI, CRM, MDT |

TABLE 1-continued

Exemplary Use Cases

| Task | Application | Use case to be solved by PDT | Sources of information (raw data or analytics of raw data) as possible inputs to PDT manager |
|---|---|---|---|
| | | latency), QoS/QoE mitigations, and performance degradation, disaster areas (involve 3D drone-based testing) Impact of Energy Savings on network/service/user performance: perf. Vs. energy consumption, targeted area for specific energy gains vs. performance risks Targeted QoS/QoE performance for specific CM parameters set-ups (e.g., MIMO config, beam management) Spectral efficiency optimization: areas with consistent low SE vs. 3GPP thresholds DSS (dynamic spectrum sharing) optimization V2X performance (area defined) VP customers' traces troubleshooting Services (voice/video/egaming) performance quality (QoE, retainability, accessibility) in pre-identified areas | |
| | Customer Performance | Maximize revenue (number of users) by max resources usage for increased capacity with satisfactory QoE (voice/OTT video/media//cloud gaming): monitor traffic statistics - if no increase (or decrease) detected, then it needs to be verified if either site configuration is unproperly set-up or radio resources are maxed out. QOS/QoE performance monitoring/sampling in hot spots traffic areas | PM, FM, CM, CT, CS, Planning (traffic maps) |
| | Benchmarking | BM new technologies (e.g., MIMO config, SON algorithms, NWDAF-5G solutions), features (e.g., carrier Aggregation, Dynamic Spectrum Sharing): evaluate performance gains in pre-defined/pre-scheduled areas | CM |
| New Deployments | New Deployments | SSV - coverage and RAN perf stationary to pass min. req. performance thresholds in pre-defined areas Golden cluster: RAN perf and mobility to pass min. required performance New technology features (see Benchmarking) New services (e.g., VoLTE/VoNR, OTT video streaming, VR/AR/XR, cloud gaming) - meet performance requirements and troubleshot (pre-defined or pre-identified areas) New network slices | CM, CT, Planning data (cvs logfiles) |

New use cases can be developed (or removed) based on lessons learned from existing use cases by using AI/ML techniques on PDT results. For example, for Network Performance for Energy Saving use case, if analyzing a large number of precision drive tests, it can be predicted based on ML techniques (such as Random Forest and/or Single Vector Regression) that a specific Energy Savings scheme has a very low risk of performance degradation, then that use case can be safely removed from the PDT list and eventually replaced with ML based prediction.

Contrary, for example for Customer Performance application and traffic statistics monitoring use cases, if analyzing a large number of precision drive tests, it can be predicted based on ML techniques (such as Random Forest and/or Single Vector Regression) that there is a specific type of traffic (e.g., cloud gaming) which requires additional drive test use cases due to cloud gaming services' complexity.

A.3—Entity #3—Test Scripts Library

The test scripts library 300 comprises tests definitions which need to be used with the use case under study. Each use case comes with a set of test scripts, each such set comprising one or more test scripts.

A test script contains the following information, but is not limited thereto:

1. Type which is defined by the application and use case under study (see Table 1). For example, for New Deployments application for Single Site Verification (SSV) (or cluster of SSV) use case, the list of test scripts includes, but is not limited to the following:

Coverage area and signal strength distribution within sites area

Speed test to cell (throughput) per cells or overall cluster

Ping test to cell (latency, packet lost) per cells or overall cluster

Voice test (accessibility, QoE, retainability) per cells or overall cluster

Cell reselection to a pre-defined neighboring cells list per cluster of SSV

2. KPIs mask which represents the minimum set of KPIs required for each use case and the correspondent test script with the scope for optimizing the drive testing and data processing time, and data storage.

For example:

(i) The deployment of the VoNR/VoLTE service requires, for performance evaluation and analysis, the following KPIs mask:

a. Network configuration i. All three modes: LTE, NSA, NR-SA ii. Info on: mMIMO/3D config (e.g., number of beams DL/UL, rank indicator)

b. time to default bearer establishment c. time to registration to the IMS, d. VoLTE/VoNR session success rate e. RAN status and performance: serving cell, SS-RSRP/RSRP, SS-RSRQ/RSRQ, SS-SINR/RSSI, CQI, RL failure ratio f. HO information (intra/inter frequency, success ratio)

g. Ping pongs to/from serving cell h. voice QoE (e.g., MOS, latency, jitter, packet loss, codec type/mode and rate)

i. HOIT (HO interruption time)

j. Speech interruptions k. Silent calls (ii) New Deployments require single site verification (SSV) which are needed for performance evaluations and analysis. For example, for 5G New Radio technology, the SSV use case can use the following KPIs masks, but is not limited thereto:

a. Coverage verification test script:

i. SS-RSRP (on serving site/beam)

ii. SS-RSRQ (on serving site/beam)

iii. SS-SINR (on serving site/beam)

iv. UE Transmit Power v. ServingCellDownlinkBandwidth vi. ServingCellTrackingAreaCode vii. Pusch Transmit Power b. RAN performance verification test script viii. PING—Max. Latency ix. PING—Max packet lost x. RLC Downlink Throughput xi. Rank Indication (mMIMO config)

xii. Pdsch Modulation Distribution Current xiii. RLC Throughput c. Service speed test script (http like)

xiv. Application Throughput DL/UL file based xv. Application Throughput DL/UL time based xvi. Session attempts, set-up, established, end, dropped, failed 3. Test sequence:

a. Frequency of the sessions/calls, or calls' frequency b. duration of calls/sessions (e.g., 2 min for accessibility testing, 5 min for retainability testing)

c. Other parameters if required by the use case (e.g., file size upload/download for RAN performance—parameter "throughput" testing)

4. Success indicator/metric calculated based on pre-defined fail/pass rules.

For example, for the New Deployments application for use case voice VoNR/VoLTE QoE a test records a "pass" can be calculated as success metric the % of measurements per call with QoE higher than 3 MOS.

Test scripts generate as outcome

Logfiles with raw data (time stamped KPIs, network events and reports, and serving sites configuration)

Fault flags

Success metric report

A test scrip can be accessed from the Test Scripts Lib 300 either automatically or manually Manually by the engineer designing the PDT Automatically triggered by the selected use case

A.4—Entity #4—PDT Orchestrator

The PDT Orchestrator 400 is an entity configured to executes one or more of the following:

a. Automatically generates the workorder to be remotely downloaded to the devices (test agents) executing the PDT. To do so, the orchestrator uses the following information:

When to generate a workorder based on the identified problems or routine checks list specific to each use case What to be the workflow of the workorder based on the test scripts specific to each use case Where to trigger the workorder based on the calculated route/area defined by the problems list specific to each use case b. Enforces the "definition of done" received from the PDT Application Manager and based on the use case and the corresponding selected test scripts. Therefore, the execution of the PDT is stopped automatically by meeting the "definition of done" acceptance criteria. Details are described in the present description of the PDT Orchestrator 400.

c. Collects the measurement reports and data sent back by the devices/test agents executing the PDT and stores them in the PDT database.

d. Continuously monitors the feedback from the PDT Agents Pool regarding the status of "definition of done".

e. Decides the PDT Agents Pool size (AKA devices).

The size of the PDT Agents Pool is decided on the following criteria, but not limited to:

(i) Stationary type of PDT requires one single agent. For example, for New Deployment Application with SSV use case.

(ii) Number of routes to be driven. For example, for one or more routes clustered within a small area, one PDT Agent can be used.

(iii) Statistical significance of the measurements. In this case, for example the number of PDT Agents can be calculated as follows:

Select/decide the PDT area (A) and divide it in bins (Ab), with bin size to be determined based on the sites' radius.

Load KPIs statistical characteristics (average, std values) based on either previously learnt lessons for the type of area (e.g., geography, demography) under the study or based on performance expectations. For example, a voice service quality like VoLTE (using EVS codec, full bandwidth) is expected to show an average of about 4 MOS and generally std=+/−0.2 MOS.

Calculate the minimum required error for each of the KPIs based on the required statistical significance level and KPIs statistical characteristics.

Determine the PDT minimum required measurement error

If the distributions of KPIs are

{only continuous (e.g., RF parameters such as signal strength and quality, QoE values)}

OR

{only discrete (e.g., network events such as dropped sessions, HO failures)}

Select the min. measurement error across all KPIs

Elseif (KPIs distributions are continuous AND discrete)

Select the min. measurement error across all discretely distributed KPIs

End

Based on the statistical significance requirements (e.g., 95% confidence level) and min. measurement error calculated the minimum number of calls/sessions required to meet the min. measurement error Using statistical modeling based on conditional binomial distribution which ensures that each test agent runs through each bin at least one time during the PDT duration, the number of test agents are defined by equation below $$Na = \frac{0.8 * Rc}{Tm} * \left( \sqrt{\frac{A}{Ab} - 1} + \sqrt{4 * Nc, i * \frac{A}{Ab} + 1.6 * (\frac{A}{Ab} - 1)} \right)$$

where pre-defined (input)

measurement time window (Tm), calls/sessions rate (periodicity) (Rc), and calculated (Calls or Sessions)/agent=Tm/Rc, (calls or sessions)/Bin(i)=Nc,i

A.5—Entity #5—PDT Database

The PDT database 500 comprises the PDT test scripts results, as follows:

a. raw measurement data (AKA KPIs) (in PDT recorded logfiles)

b. measurement reports (in PDT recorded logfile)

c. fault flags for each test script d. success metric for each test script e. area/route where PDT has been executed (on commonly used Maps software packages, such as Google Maps, containing also the GPS location of all the cell sites on the route/within area)

f. report (i) if a suggested route has been used rather than the one originally given (selected or calculated) and (ii) the distance to the original route.

For example, in the case areas/routes defined by "sweet spots", it is likely that either they do not fall on a commonly used Maps software packages (such as the aforementioned Google Maps) road or are not accessible due to geography, buildings, accidents, road construction, or other.

A.6—Entity #6—PDT Agents Pool

The PDT agents pool 600 comprises all the test agents in the field (AKA devices) and each agent runs the following edge analytics:

a. Collect raw data as defined by the workload pushed by the PDT Orchestrator b. Report status of the drive based on the "definition of done" and based on which the PDT Orchestrator can close the PDT as a successful one or reorders a repeat or orders a manual verification of the reason for a "time out" message.

c. Report route change and calculate distance to the original route d. Upload to the PDT database 500 all the test script results (as described above in connection with Entity #5).

B. Methodology Protocol

The protocol for the methodology includes the following steps, a number of which are presented in FIG. 1.

a. Select application and use case 140. The selection can be done manually (by an engineer) or automatically in a periodic 132, scheduled 134 or triggered 136 manner. The latter is caused by a detected problem/fault as identified by the PDT Application Manger 100 (as described above in connection with Entity #1)

b. Identify problems list(s) 142. The identification is based on the selected application and use case; examples are addressed in Table 1.

c. Run validation and acceptance of the identified problems 144. This is done in order to avoid either random spikes or artificial problems and/or expected problems possibly inferred from external data sources. For example, if outage is not recorded as information in PDT Application Manger, then it is flagged as a problem which could trigger PDT requests, while this not being needed in the case of an outage.

d. Validation of the sites' identification (AKA Physical Cell Identification PCI) against the csv logfile correspondent to the identified problem(s) list or routine checks list (FIG. 1). See details in Section B.1 below e. Based on the problems list(s) and the sites information (identification number and geolocation) identify the problem area 146. See details in Section B.2 below.

f. Calculate routes or select routes 150 (in the case of routine checks for New Deployment and Benchmarking applications). See details in Section B3 below.

g. Generate navigation maps 152. The navigation maps are generated using commonly used Maps software packages (e.g., Google Maps)

h. Push or load (manually or automatically) use case, test script(s) list and navigation directions to PDT Orchestrator i. PDT Orchestrator 400 creates the workorder to which attaches the "definition of done" criteria and automatically sends these to the devices/test agents to execute the PDT j. Test agents run the workorder on the defined route/area until a. "Definition of done" is met and the test agents are sending back to PDT Orchestrator 400 the PDT results which are then stored in the PDT database 500

OR b. PDT Orchestrator 400 receives message of "time out" (see section B.5 below) from the test agents. In this case, the time out reason is verified and removed by the engineer in charge of the PDT, and a "repeat workorder" is generated. The time out message can be caused by failures such as, but not limited to: "overheating device", "no data recorded"

B.1 Validation of Sites (PCIs)

It is not uncommon that the cvs logfile comprising the information on sites (site identification PCI and its GPS location) does not match the PCIs in the file. Therefore, before further using the cvs logfile for defining/calculating PDT area and routes, a validation process needs to take place.

The validation process runs a matching algorithm between the cvs logfile and the field geolocation of the sites.

B.2 PDT Area Definition

The PDT area is defined using one or more of: (a) Site(s) geolocation(s) for identified problem(s), and (b) Site(s) geolocation(s) selected for routine checks (e.g., maintenance),

B.2.1 Site(s) Geolocation(s) for Identified Problem(s)

Based on the use case, the problem(s) list(s) is created based on analytics reports or raw data of applications as described above.

The problem(s) list(s) come with the parameters (sites identification number and geo location) of all the sites detected to contribute to the problem identified and reported by analytics reports or raw data.

The problem area is defined as follows (i) Identify if the problem(s) affect(s) cluster of sites or isolated site a. Load sites' GPS location b. Apply ML K-means with Euclidean distance to find number of clusters and number of sites per cluster (ii) If ("one site in a cluster—isolated site case")

a. Load site information logfile (AKA cvs logfile) and extract the site's coverage area (radius)

b. Calculate the regular polygon inscribed in the coverage circle; the number of polygon's sides to be determined by $$n = \begin{cases} \text{arch length corresponding to the beam widths, if } mMIMO \\ 12, \text{if non } mMIMO \end{cases}$$

where beam width=360/(nr of beams)

c. Calculate the polygon peaks based on site's GPS location and site's radius d. Report the polygon as the "problem area"

(iii) Elseif ("if more than one site in a cluster & only one cluster of sites")

a. Load site information logfile (AKA cvs logfile) and extract the sites coverage polygons for each site b. Use geographic midpoint calculation technique to determine the center of the cluster c. Calculate the radius of the center of the cluster as defined by the farthest site from the center d. Repeat (ii)b-(ii)d ("polygon" is for this case "envelope polygon")

(iv) Elseif ("if more than one site in a cluster & more clusters of sites")

a. Repeat (iii) for each cluster (v) End

B.2.2 Site(s) Geolocation(s) Selected for Routine Checks

In the case of scheduled use cases for New Deployments and Benchmarking applications, the routine checks come with already selected area, which should be defined as follows:

```
If Routine Checks are required then verify use case
  1. If SSV use case
       (a) load sites GPS location and radius
       (b) run (B.2.1)(ii)
  2. Else (other than SSV, meaning for example: SSV
  cluster, benchmarking, new
       service launch)
       (a) run (B.2.1)(iii)
  3. end
End
```

B.3 Routes Calculation

PDT routes are calculated or selected either based on sites' GPS location and PDT area definition or based on a set of pre-defined "sweet spots". The "sweet spots" represent specific points of interest as described in Section B.4 below.

The following steps describe the PDT route calculations/selection:

(i) If PDT routes are required by problem(s) identification with sites list:

i. calculate PDT route(s)

i. Load area polygon ii. Load commonly used Maps software packages (e.g., Google Maps)

iii. Run route optimization with the criteria "max number of routes within polygon"

iv. Create navigation directions for each route found in the polygon.

v. Send navigation direction to the PDT orchestrator workorder comprising the problem(s) which identified the PDT area (ii) Elseif (if they emerge from routine checks)

i. Select routes i. Load commonly used Maps software packages (e.g., Google Maps)

ii. Create navigation directions for selected routes iii. Send navigation direction to the PDT orchestrator workorder comprising the PDT routine checks (iii) Elseif ("sweet spot" scouting list provided)

i. Load GPS location of the "sweet spots"

ii. Load commonly used Maps software packages (e.g., Google Maps)

iii. Verify sweet spot(s) existence on the map iv. If "sweet spot" does not exist on commonly used Maps software packages (e.g., Google Maps) real roads or if sweet spot is not accessible due to various reasons such as, but not limited to: buildings, accidents, road constructions/closers 1. Using min. Euclidian distance find the closes point on a commonly used Maps software packages (e.g., Google Maps) road called "sweet spot twin"

2. Record number of "sweet spot twins"

v. End vi. Create navigation directions for routes defined by the "sweet spots" and/or their real road twins (in commonly used Maps software packages—(e.g., Google Maps)

vii. Flag if a new route has been created, the number of sweet spot twins used and their distance from the original "sweet spot".

viii. Send navigation direction to the PDT orchestrator workorder comprising the PDT problem(s) identifications or routine checks (iv) End

B.4 "Sweet Spots" Calculation/Selection Criteria

The "sweet spots" represent specific points of interest determined by the following criteria, but not limited to:

(1) Geography

For example, for New Deployments application with SSV use case, stationary tests come with a set of pre-selected "sweet spots"

next to the site (GPS location of the site), at a distance to site's center equal with half of the site's radius; number of points determined by an angle of 360/12 (for non MiMO systems) or angle=beamwidth (for MIMO systems)

at a distance to site's center equal with the site's radius and at angles=360/12 (for non MiMO systems) or angles=beamwidth (for MIMO systems)

(2) Prediction

For example, for Network Planning for testing/tuning prediction model use case, the "sweet spots" can be the best predicted spots (information extracted from Planning data) which need to be verified against field data (minimum acceptance criteria) within a pre-defined area (3) Testing For example, for Network Performance application with mobility use case, the "sweet spots" can be defined as location at which previous tests showed excessive number of ping-pongs or handover (HO) failures (information extracted from PM or CT or previous drive testing campaigns)

with Energy Saving use case the "sweet spots" can be defined as points on routes within an area for which the serving sites have the Energy Saving features enabled (information extracted from CM data source)

For example, for Customer Performance application with VP troubleshooting use case, the "sweet spots" can be defined as point on VP's daily routes (information extracted from CT or CRM data)

with QoE performance monitoring/sampling in hot spot traffic areas use case, the "sweet spots" can be determined as points in fringe area of the sites covering the hot spot traffic area. Information on sites' fringe area can be calculated from Planning data and the hot spot traffic area can be extracted from Crowd Source data.

B.5 "Definition of Done"

Depending on the PDT Application Manager 100, criteria for "definition of done" can include the following, but is not limited to (1) Invalid data is identified: equipment reported failures, no recordings in the logfiles (2) Complete drive of PDT routes (3) Complete drive of PDT area, for example for Network Performance application with "disaster area" use case (4) Success metrics met for all the test scripts (5) All the test scripts are recorded with "Pass/fail" flag based on test script (6) Finish PDT duration pre-defined by statistics above a required threshold for a pre-defined confidence level (7) Time out message, for example unexpected site outage which occurs after PDT has been launched and it is sensed during PDT as one or more sites consistently undiscovered resulting in extensive number of access failures which are continuously reported during the PDT drive. Another example can be of sensed overheating device.

The "definition of done" is pushed by the PDT Orchestrator to the PDT Agents Pool for each use, calculated/selected area/drive

C. PDT System Design

Figure 2:
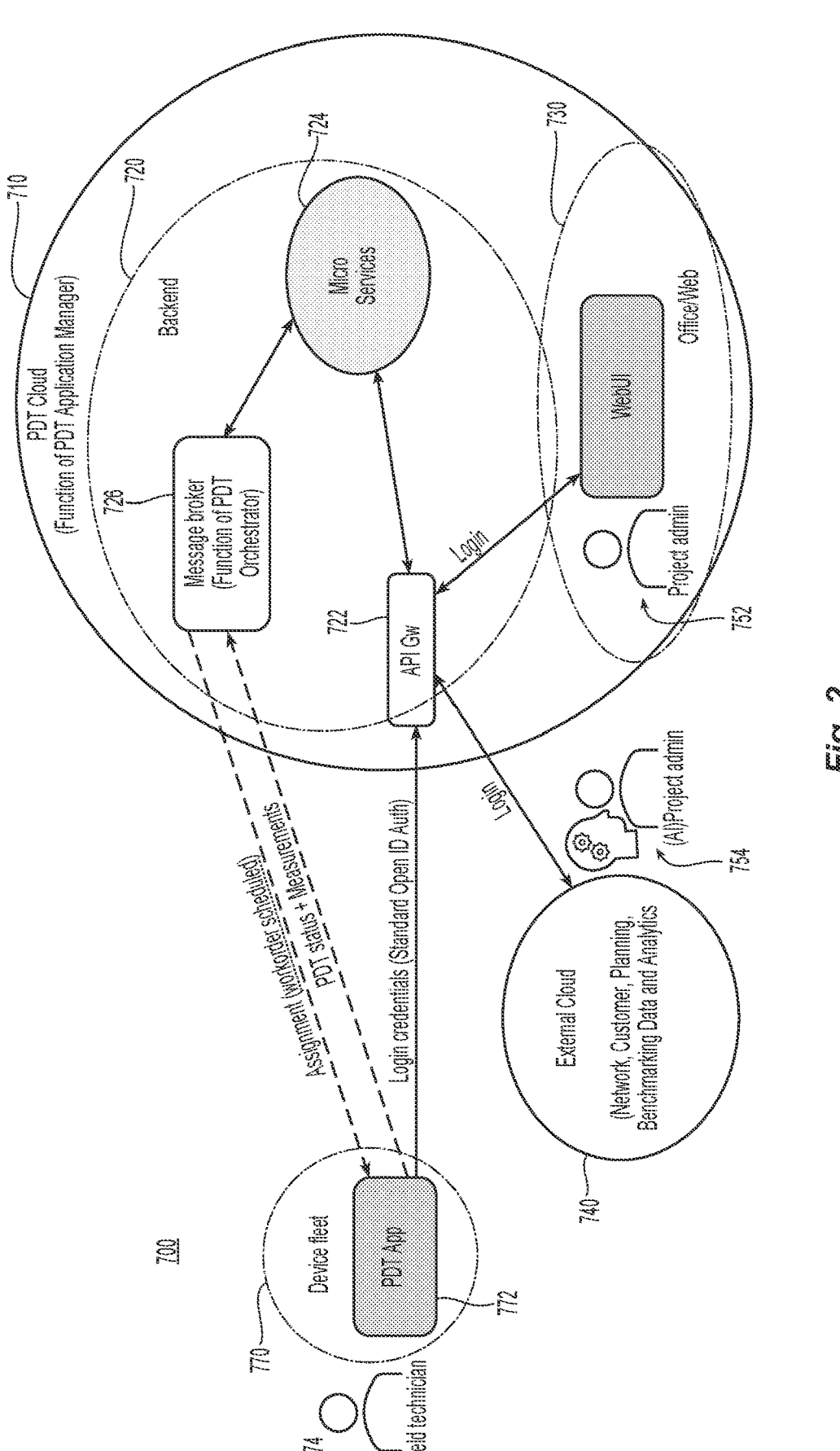
FIG. 2 presents the system architecture of the present approach.

FIG. 2 shows one embodiment of the PDT system 700. The PDT system 700 is designed as a flexible and scalable cloud architecture configured to accommodate the framework methodology with its six entities described above with reference to FIG. 1, enabling automation and open interfaces (Application Programming Interface, API) towards the test agents distributed in the field and external data sources or data management and analytics (cloud based) platforms).

The PDT system 700 comprises a PDT Cloud 710, an external cloud 740, and a device fleet 770.

The device fleet 770 comprises one or more drive vehicles which constitute the platforms that do the physical drive testing. Each drive vehicle is operated by a field technician 774 and carries a computing and communication platform ("device") which is provisioned with a PDT App 772. Using the PDT App 772, the field technician 774 can login to the system 700 via the API GW 722 (described below) to present credentials and signal availability for drive testing assignments. The PDT App 772 communicates with the message broker 726 (described below). The PDT App 772 receives workorders (comprising, for instance, drive testing assignments), and other instructions, and sends status information and measurement data. The PDT App 772 is also configured to run the edge analytics described above.

The PDT cloud 710 is where the PDT Application Manger function is executed. Residing in the PDT cloud 710 are a Backend 720 and an OfficeWeb interface 730 for an (internal) project administrator 752 to communicate with the remainder of the system 700.

In some embodiments, the Backend 720 comprises the following components:

(1) API GW 722. The API GW (Application Programming Interface Gateway) is the gateway through which the PDT cloud is accessed using standard open ID authentication protocols, for example GraphQL. The API GW 722 is used by both the internal administrator and external administrator, who login to gain access.

(2) Micro Services 724. The micro services (also referred to as utilities) are configured to perform the following functions:

i. Project definition: define a project based on the uses cases (from the Use Cases Library 200, described above.

ii. Workflows definition: create the workflows based on the test scripts (from Test Scripts Library 300 (described above) corresponding to the use case), iii. PDT drives definition: verify sites (PCIs) and calculates or selects areas and/or routes 150, iv. Workorder generation: associate workflows, drive routes instructions, definition of done (PDT orchestrator function 400), v. PDT results storage and analysis (PDT data base 500), which can be further automatically analyzed running use case centric pre-defined Root Cause Analysis flowcharts. This can be reformed within or outside the PDT Cloud.

vi. PDT decision process: schedule of PDT campaigns based on new projects requests and based on the "definition of done" results and its status reports sent during and at the end of PDT campaigns.

(3) Message Broker 726. The Message Broker executes the PDT Orchestrator function 400 as described above in section A.4. In some embodiments, the message broker is configured to perform the following functions:

i. Sends the Assignment(s) to PDT App 772 on the test agent(s) (AKA device fleet 770). The Assignment is booked by the field technician 774, based on his user single sign on login. The Assignments contain workorder(s) with instructions on routes and definition of done. The field technician 774 needs only to drive the route as given by the Assignment, to check the given routes checkpoints, and to check out when "definition of done" is reported by the device-based PDT App 772. Therefore, the field technician 774 is not required to have specific engineering knowledge/ skills.

ii. Receives from the test agent/device-based PDT App report on status of "definition of done", PDT progress and measurements data. In those cases, in which a PDT "time out" message is received, the message broker 726 may perform the following:

1. Order the field technician 774 to hold (suspend) the PDT, and

2. Send the report to the Microservices which takes decisions on the PDT status and sends these back to the Broker which creates a new assignment.

The external cloud 740 comprises raw data and data management analytics from various sources, network, customer, planning and benchmarking.

Depending on how it is configured, the PDT system 700 can enable one of the following:

(i) A cloud residing administrator 752 (called internal administrator) who designs, controls and manages the PDT per engineering requests, and this can be executed by an engineer or automatically performed by PDT Application Manger function (ii) An external cloud residing administrator 754 (called external administrator). The admin tasks can be executed by an engineer or automatically pushed to PDT cloud based on the PDT Application Manager function as described above in section A.1.

It can be seen from the foregoing that the subject matter of the present application provides a solution that not only predicts where to drive and what tests to perform, but also which hot spots and critical area should be tested. These are collectively referred to as the aforementioned "sweet spots".

Based on the position of a given cell, and the available roads surrounding that cell, the present system and method can predict the best route to drive, which optimized the time taken to perform sufficient tests required to diagnose the problem and/or determine acceptance in the case of a new deployment.

Optimized routes can be based on cell position. Thus, the navigation will be optimized to minimize the test time taken to perform the driving.

Predicting sweet spots for stationary testing can be based either on scout drives or on cell information, calculating where the optimal spot for a particular test will be. The field agent will be directed to that spot.

What is claimed is:

1. A method for automatically directing drive testing by field agents, each of whom is provisioned with a drive test agent configured to assess network performance and/or service and/or user experience in a geographical area, the method comprising:

obtaining a use case for the drive test agent in response to an automated request from either an external data source or an internal data source;

automatically retrieving one or more test scripts corresponding to the obtained use case;

obtaining from the use case, information regarding the location of one or more network sites or one or more areas of interest to which the automated request pertains, and determining the geographical area to be drive tested;

calculating one or more drive test routes for each drive test agent, in order to cover the determined geographical area;

sending to one or more drive test agents, the test scripts corresponding to the obtained use case along with definition of done criteria and drive test routes, so that each corresponding field agent can conduct a drive test within said determined geographical area, the definition of done criteria including at least a statistical significance level threshold and an acceptable measurement error;

automatically receiving real time feedback from each drive test agent regarding the status of that drive test;

automatically sending one or more instructions to said each drive test agent in response to the real time feedback provided by that agent, said instructions comprising one or more of route updates, corrected test scripts, modified test scripts and repeated test scripts; and automatically receiving and uploading final drive test results upon satisfaction of the definition of done criteria by each drive test agent.

2. The method according to claim 1, wherein the external data source comprises network data and/or service data and/or user experience data regarding quality degradation and/or failures and/or alarms.

3. The method according to claim 1, wherein the internal data source comprises real time network and/or real time service and/or real time user experience quality sensing obtained from one or more predictive machine learning (ML)/artificial intelligence (AI) algorithms embedded in the drive test agent.

4. The method according to claim 1, further comprising sending to the one or more drive test agents, one or more of specific set of key performance indicators (KPIs) to be collected, device/network events to be collected, and drive test success metrics.

5. The method according to claim 4, further comprising:

for the obtained use case, applying KPI masks to optimize the number of test scripts and the size of the collected KPIs data set.

6. The method according to claim 1, wherein the final drive test results include collected key performance indicators (KPIs), device/network events, fault flags report, drive test success metrics of pass/fail tests and driven route(s) with any information about changes to the original route(s).

7. The method according to claim 1, further comprising, after automatically receiving and uploading final drive test results: enriching the use case/test scripts pairs with new and/or modified use case/test scripts, based on lessons learned using machine learning (ML)/artificial intelligence (AI) techniques.

8. The method according to claim 1, wherein the real time feedback from each drive test agent regarding the status of the drive test is one from the group consisting of:

(i) satisfying the definition of done;

(ii) test device or agent and/or equipment malfunction;

(iii) modified drive routes due to unexpected traffic events;

(iv) failed test script due to lack of network and/or service access; or (v) failed test script due to lack of KPIs required by the obtained use case.

9. The method according to claim 1, wherein:

the use case is obtained in response to a problem automatically identified by said external data source, the problem pertaining to network and/or service and/or customer experience quality degradation and/or failures and/or alarms.

10. The method according to claim 9, comprising:

the test scripts sent to each drive test agent contain information about the specific data to be collected; and the specific data to be collected comprises a set of key performance indicators and/or device/network events sufficient to solve the problem corresponding to the use case.

11. The method according to claim 1, wherein:

the use case is obtained in response to a problem identified by one or more predictive machine learning (ML)/ artificial intelligence (AI) algorithms embedded on the drive test agent, the problem pertaining to real time network and/or real time service and/or real time user experience quality sensing.

12. The method according to claim 11, comprising:

the test scripts sent to each drive test agent contain information about the specific data to be collected; and the specific data to be collected comprises a set of key performance indicators and/or device/network events sufficient to solve the problem corresponding to the use case.

13. The method according to claim 1, wherein determining the geographical area to be drive tested comprises:

(a) calculating a boundary of the geographical area based on the geolocation of the network sites under study; and/or (b) calculating a boundary of the geographical area based on the geolocation coordinates of the area of interest.

14. The method according to claim 13, wherein the step of calculating the one or more drive test routes comprises:

(a) geographical optimization to calculate routes which maximize the covered area within the whole geographical area to be tested; or (b) optimizing a route to a cover list of sweet spots previously defined by one or more of the following criteria (i) geography, (ii) prediction, and (iii) testing.

15. The method according to claim 1, wherein:

the use case is obtained in response to an automated request corresponding to a predetermined monitoring and/or maintenance schedule.

16. The method according to claim 1, wherein:

the use case is obtained in response to a request made pursuant to (a) a new deployment, wherein the new deployment is a new site, a new device or a new service, and/or (b) a benchmarking task.

17. The method according to claim 16, wherein:

the step of determining one or more drive test routes comprises obtaining a predefined route corresponding to a location of the new deployment and/or a location of a benchmarking task.

18. The method according to claim 1, further comprising:

determining the number of drive test agents to whom the test scripts are to be sent, prior to sending the test scripts, wherein:

the number of drive test agents required for a drive test specific to a use case is determined using one or more of the following: (i) number of routes to be driven (ii) minimum required statistical significance of the measurements, and (iii) acceptable measurement standard error.

19. The method according to claim 1, comprising:

ordering a halt to a particular drive test agent's drive test, upon automatically receiving real time feedback from that drive test agent indicating a problem with either that drive test agent's equipment or the network.

20. The method according to claim 1, comprising:

updating the drive test of a given drive test agent, in response to automatically receiving real time feedback from that drive test agent.

21. The method according to claim 1, comprising:

determining the definition of done criteria further including minimum performance requirements for a set of key performance indicators (KPIs) constituting the test scripts or indication of equipment malfunction and/or or network malfunction.

22. The method according to claim 1, wherein all steps are performed without human intervention.

23. The method according to claim 1, wherein at least one of the following steps is performed by a human: (a) obtaining a use case; and (b) retrieving one or more test scripts.

24. The method according to claim 1, comprising:

providing six software entities collectively configured to implement a precision drive testing (PDT) methodology, the six software entities comprising:

(a) a use cases library defined by network/customer problems or network planning or new deployments or benchmarking and which require a drive test (DT);

(b) a test scripts library with minimized test key performance indicators (KPIs) (use cases centric masks on KPIs measured in a KPIs database), real time error/ malfunctioning flags and success metric (pass/fail);

(c) a PDT application manager configured to implement control PDT triggering:

period, event triggered, scheduled;

(d) a PDT application manager executed by engineer or automated;

(e) a PDT Orchestrator configured to (i) create work orders, (ii) assign area/route drive test agents to the work orders, and (iii) create definition of done criteria; and (f) PDT Area/routes categories: geography, predicted, tested, sweet spots.

25. The method according to claim 1, wherein the internal data source comprises real time network, real time service, or real time user experience quality sensing obtained from one or more predictive machine learning (ML)/artificial intelligence (AI) algorithms embedded in or accessible by the drive test agent.

26. A method for automatically directing drive testing by field agents to assess network performance, service, or user experience in a geographical area, the method comprising:

automatically retrieving one or more test scripts corresponding to a use case;

automatically receiving real time feedback from a drive test agent regarding the status of a drive test;

automatically sending one or more instructions to the drive test agent in response to the received real time feedback provided by the drive test agent, the instructions comprising one or more of route updates, corrected test scripts, modified test scripts, or repeated test scripts; and automatically receiving and uploading final drive test results upon satisfaction of a definition of done criteria by the drive test agent, the definition of done criteria including at least a statistical significance level threshold and an acceptable measurement error.

\* \* \* \* \*